United States Patent [19]

Fan

[11] Patent Number: 5,359,676
[45] Date of Patent: Oct. 25, 1994

[54] DECOMPRESSION OF STANDARD ADCT-COMPRESSED DOCUMENT IMAGES

[75] Inventor: Zhigang Fan, Webster, N.Y.

[73] Assignee: Xerox Corporation, Stamford, Conn.

[21] Appl. No.: 93,546

[22] Filed: Jul. 19, 1993

[51] Int. Cl.[5] .............................................. G06K 9/36
[52] U.S. Cl. ...................................... 382/56; 382/22; 382/54; 358/433
[58] Field of Search .......................... 382/54, 22, 56; 358/133, 462, 426, 466, 432, 433, 456

[56] References Cited

U.S. PATENT DOCUMENTS

| | | | |
|---|---|---|---|
| 4,999,705 | 3/1991 | Puri | 358/136 |
| 5,001,429 | 3/1991 | Constable et al. | 324/312 |
| 5,001,559 | 3/1991 | Gonzales et al. | 358/133 |
| 5,049,991 | 9/1991 | Niihara | 358/136 |
| 5,170,264 | 12/1992 | Saito et al. | 358/426 |
| 5,243,444 | 9/1993 | Fan | 382/54 |

OTHER PUBLICATIONS

W. H. Chen & C. H. Smith, "Adaptive Coding of Monochrome and Color Images", IEEE Trans. Comm., vol. Com-25, No. 11, Nov. 1977, pp. 1285-1292.

P. G. Roetling, "Visual Performance and Image Coding", Proceedings of the S.I.D., 17/2, pp. 111-114 (1976).

Reeve, III et al, "Reduction of Blocking Effects in Image Coding", Optical Engineering, Jan./Feb., 1984, vol. 23, No. 1, p. 34.

C. Avril et al, "Linear Filtering for Reducing Blocking Effects in Orthogonal Transform Image Coding", Journal of Electronic Imaging, Apr. 1992, vol. 1(2), pp. 183-191.

Rosenholtz et al, "Iterative Procedures for Reduction of Blocking Effects in Transform Coding", SPIE, vol. 1452, Image Processing Algorithms and Techniques II, (1991), pp. 116-126.

*Primary Examiner*—David K. Moore
*Assistant Examiner*—Matthew C. Bella
*Attorney, Agent, or Firm*—Mark Costello

[57] ABSTRACT

A method of improving the appearance of an ADCT decompressed document image while maintaining fidelity with an original document image from which it is derived, the method including the decompression steps of: a) receiving the encoded quantized transform coefficient blocks for the original image; b) removing any lossless encoding of the quantized transform coefficient blocks for the original image; c) multiplying each quantized transform coefficient in a block by a corresponding quantizing value from the quantization table to obtain a block of received transform coefficients; d) recovering the image by applying an inverse transform operation to the received transform coefficients; e) i) adaptively selecting on a block by block basis a filter threshold, ii) detecting edges within the block and forming a mapping of the edges occurring, and iii) iteratively filtering for a predetermined number of times the image with a smoothing filter, the filtering operation controlled by the derived edge map so as not to operate on image edges; f) comparing each block of new transform coefficients to a corresponding block of received transform coefficients and the selected quantization table, to determine whether the filtered recovered image is derivable from the original image; and g) upon the determination transferring the filtered recovered image to an output buffer.

10 Claims, 15 Drawing Sheets

FIG. 2A

IMAGE DATA

| 216 | 218 | 215 | 93  | 39  | 145 | 96 | 173 |
|-----|-----|-----|-----|-----|-----|----|-----|
| 218 | 217 | 216 | 122 | 42  | 61  | 61 | 163 |
| 218 | 218 | 217 | 201 | 90  | 41  | 37 | 41  |
| 218 | 218 | 218 | 218 | 214 | 170 | 68 | 53  |
| 218 | 217 | 213 | 146 | 137 | 196 | 99 | 169 |
| 218 | 218 | 212 | 78  | 39  | 130 | 86 | 172 |
| 218 | 218 | 217 | 143 | 47  | 42  | 41 | 49  |
| 218 | 218 | 218 | 214 | 151 | 74  | 43 | 52  |

FIG. 2B

DCT VALUES

| 157 | 430  | 83  | -109 | -34 | -28 | 94  | -41 |
|-----|------|-----|------|-----|-----|-----|-----|
| 10  | -40  | 56  | -18  | -13 | -6  | 22  | -11 |
| -73 | 34   | 63  | -58  | -5  | 21  | -8  | 3   |
| 14  | -116 | 160 | -1   | -75 | -35 | 78  | -16 |
| 108 | -53  | -86 | 72   | 10  | -28 | 9   | -4  |
| -27 | 50   | -52 | 25   | -14 | 22  | -19 | 4   |
| -3  | -3   | 9   | 0    | -8  | 4   | 2   | -5  |
| -22 | 20   | 3   | -14  | -2  | 19  | -8  | -8  |

FIG. 2C

Q-TABLE

| 16 | 11 | 10 | 16 | 24  | 40  | 51  | 61  |
|----|----|----|----|-----|-----|-----|-----|
| 12 | 12 | 14 | 19 | 26  | 58  | 60  | 55  |
| 14 | 13 | 16 | 24 | 40  | 57  | 69  | 56  |
| 14 | 17 | 22 | 29 | 51  | 87  | 80  | 62  |
| 18 | 22 | 37 | 56 | 68  | 109 | 103 | 77  |
| 24 | 35 | 55 | 64 | 81  | 104 | 113 | 92  |
| 49 | 64 | 78 | 87 | 103 | 121 | 120 | 101 |
| 72 | 92 | 95 | 98 | 112 | 100 | 103 | 99  |

FIG. 2D

QUANTIZED DCT VALUES USING Q-TABLE

| 10 | 39 | 8  | -7 | -1 | -1 | 2 | -1 |
|----|----|----|----|----|----|---|----|
| 1  | -3 | 4  | -1 | -1 | 0  | 0 | 0  |
| -5 | 3  | 4  | -2 | 0  | 0  | 0 | 0  |
| 1  | -7 | 7  | 0  | -1 | 0  | 1 | 0  |
| 6  | -2 | -2 | 1  | 0  | 0  | 0 | 0  |
| -1 | 1  | -1 | 0  | 0  | 0  | 0 | 0  |
| 0  | 0  | 0  | 0  | 0  | 0  | 0 | 0  |
| 0  | 0  | 0  | 0  | 0  | 0  | 0 | 0  |

FIG. 3A

DCT COEFFICIENTS (MULTIPLY FIG. 2C VALUES BY FIG. 2D)

| 160 | 429  | 80  | -112 | -24 | -40 | 102 | -62 |
|-----|------|-----|------|-----|-----|-----|-----|
| 12  | -36  | 56  | -19  | -26 | 0   | 0   | 0   |
| -70 | 40   | 64  | -48  | 0   | -1  | 0   | 0   |
| 14  | -119 | 154 | 0    | -51 | 0   | 80  | -1  |
| 108 | -44  | -74 | 56   | 0   | 0   | 0   | 0   |
| -24 | 35   | -55 | 0    | 0   | 0   | 0   | 0   |
| 0   | 0    | 0   | 0    | 0   | 0   | 0   | 0   |
| 0   | 0    | 1   | 0    | 0   | 0   | 0   | 0   |

FIG. 3B

DECOMPRESSED IMAGE

| 220 | 214 | 220 | 102 | 45  | 137 | 97  | 180 |
|-----|-----|-----|-----|-----|-----|-----|-----|
| 220 | 231 | 204 | 119 | 37  | 64  | 62  | 145 |
| 204 | 237 | 212 | 192 | 111 | 61  | 25  | 55  |
| 205 | 224 | 225 | 228 | 187 | 156 | 64  | 58  |
| 229 | 207 | 213 | 155 | 133 | 197 | 121 | 165 |
| 224 | 199 | 206 | 96  | 40  | 123 | 74  | 168 |
| 211 | 211 | 213 | 141 | 60  | 66  | 11  | 82  |
| 221 | 234 | 214 | 212 | 143 | 85  | 25  | 53  |

FIG. 6

Possible Source Images

100:
```
216  218  215   93   39  145   96  173
218  217  216  122   42   61   61  163
218  218  217  201   90   41   37   41
218  218  218  218  214  170   68   53
218  217  213  146  137  196   99  169
218  218  212   78   39  130   86  172
218  218  217  143   47   42   41   49
218  218  218  214  151   74   43   52
```
→ DCT (108)

102:
```
220  214  220  102   45  137   97  180
220  231  204  119   37   64   62  145
204  237  212  192  111   61   25   55
205  224  225  228  187  156   64   58
229  207  213  155  133  197  121  165
224  199  206   96   40  123   74  168
211  211  213  141   60   66   11   82
221  234  214  212  143   85   25   53
```
→ DCT

104:
```
215  217  219  115   50  136   97  193
217  218  216  111   50   51   53  143
215  218  216  208  110   52   55   54
216  217  216  209  190  168   55   65
218  216  214  142  142  177  124  165
217  213  211   95   62  129   66  165
218  214  211  141   64   58   35   66
222  218  215  214  143   69   42   45
```
→ DCT

106:
```
217  216  218  115   50  136   97  189
218  218  212  110   51   53   60  145
214  224  219  199  115   57   41   52
213  217  220  218  183  158   58   65
216  214  214  143  141  192  122  166
216  212  208   96   55  125   74  166
217  214  212  142   62   65   18   75
220  219  218  213  142   74   33   46
```
→ DCT

DCT Coefficients — 110

| 157 | 430 | 83 | -109 | -34 | -28 | 94 | -41 |
|---|---|---|---|---|---|---|---|
| 10 | -40 | 56 | -18 | -13 | -6 | 22 | -11 |
| -73 | 34 | 63 | -58 | -5 | 21 | -8 | 3 |
| 14 | -116 | 160 | -1 | -75 | -35 | 78 | -16 |
| 108 | -53 | -86 | 72 | 10 | -28 | 9 | -4 |
| -27 | 50 | -52 | 25 | -14 | 22 | -19 | 4 |
| -3 | -3 | 9 | 0 | -8 | 4 | 2 | -5 |
| -22 | 20 | 3 | -14 | -2 | 19 | -8 | -8 |

→ Quantization — 118

— 112

| 160 | 429 | 80 | -112 | -24 | -40 | 102 | -62 |
|---|---|---|---|---|---|---|---|
| 12 | -36 | 56 | -19 | -26 | 0 | 0 | 0 |
| -70 | 40 | 64 | -48 | 0 | -1 | 0 | 0 |
| 14 | -119 | 154 | 0 | -51 | 0 | 80 | -1 |
| 108 | -44 | -74 | 56 | 0 | 0 | 0 | 0 |
| -24 | 35 | -55 | 0 | 0 | 0 | 0 | 0 |
| 0 | 0 | 0 | 0 | 0 | 0 | 0 | 0 |
| 0 | 0 | 1 | 0 | 0 | 0 | 0 | 0 |

→ Quantization

— 114

| 163 | 424 | 75 | -112 | -17 | -33 | 89 | -34 |
|---|---|---|---|---|---|---|---|
| 15 | -42 | 56 | -28 | -13 | -4 | 16 | -6 |
| -68 | 39 | 56 | -57 | 3 | 18 | -5 | -1 |
| 21 | -111 | 144 | -7 | -57 | -37 | 73 | -10 |
| 99 | -50 | -63 | 53 | 3 | -11 | 4 | -8 |
| -12 | 31 | -45 | 17 | -2 | 10 | 0 | -16 |
| 14 | -6 | -6 | -5 | 4 | 9 | -3 | -10 |
| 4 | -3 | 5 | -11 | -4 | 26 | -24 | 6 |

→ Quantization

— 116

| 162 | 424 | 75 | -113 | -19 | -38 | 97 | -42 |
|---|---|---|---|---|---|---|---|
| 16 | -41 | 57 | -23 | -15 | -1 | 7 | 1 |
| -69 | 40 | 56 | -53 | 6 | 13 | -2 | 0 |
| 21 | -118 | 147 | -4 | -57 | -26 | 69 | -12 |
| 100 | -49 | -68 | 51 | 1 | -3 | 3 | -9 |
| -16 | 39 | -46 | 8 | 3 | 8 | 2 | -17 |
| 10 | -1 | -6 | -3 | 0 | 7 | -5 | -5 |
| 5 | -1 | 0 | -1 | -5 | 9 | -8 | 1 |

→ Quantization

FROM: FIG. 6

Quantized DCT Coefficients — 120

| 10 | 39 | 8  | -7 | -1 | -1 | 2 | -1 |
|----|----|----|----|----|----|---|----|
| 1  | -3 | 4  | -1 | -1 | 0  | 0 | 0  |
| -5 | 3  | 4  | -2 | 0  | 0  | 0 | 0  |
| 1  | -7 | 7  | 0  | -1 | 0  | 1 | 0  |
| 6  | -2 | -2 | 1  | 0  | 0  | 0 | 0  |
| -1 | 1  | -1 | 0  | 0  | 0  | 0 | 0  |
| 0  | 0  | 0  | 0  | 0  | 0  | 0 | 0  |
| 0  | 0  | 0  | 0  | 0  | 0  | 0 | 0  |

Q-Table — 119

| 16 | 11 | 10 | 16 | 24  | 40  | 51  | 61  |
|----|----|----|----|-----|-----|-----|-----|
| 12 | 12 | 14 | 19 | 26  | 58  | 60  | 55  |
| 14 | 13 | 16 | 24 | 40  | 57  | 69  | 56  |
| 14 | 17 | 22 | 29 | 51  | 87  | 80  | 62  |
| 18 | 22 | 37 | 56 | 68  | 109 | 103 | 77  |
| 24 | 35 | 55 | 64 | 81  | 104 | 113 | 92  |
| 49 | 64 | 78 | 87 | 103 | 121 | 120 | 101 |
| 72 | 92 | 95 | 98 | 112 | 100 | 103 | 99  |

FROM: FIG. 7

FIG. 10A

| 256 | 132 | 160 | 64 | 0 | 0 | 0 | 0 |
|-----|-----|-----|-----|---|---|---|---|
| 312 | 24 | -168 | -114 | 0 | 0 | 0 | 0 |
| 140 | -260 | 64 | 96 | 0 | 0 | 0 | 0 |
| -168 | 136 | 44 | 0 | 0 | 0 | 0 | 0 |
| -36 | 44 | 0 | 0 | 0 | 0 | 0 | 0 |
| 48 | -70 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 10B

Q-TABLE

| 32 | 22 | 20 | 32 | 48 | 80 | 102 | 122 |
|----|----|----|----|----|----|----|----|
| 24 | 24 | 28 | 38 | 52 | 116 | 120 | 110 |
| 28 | 26 | 32 | 48 | 80 | 114 | 138 | 112 |
| 28 | 34 | 44 | 58 | 102 | 174 | 160 | 124 |
| 36 | 44 | 74 | 112 | 136 | 218 | 206 | 154 |
| 48 | 70 | 110 | 128 | 162 | 208 | 226 | 184 |
| 98 | 128 | 156 | 174 | 206 | 242 | 240 | 202 |
| 144 | 184 | 190 | 196 | 224 | 200 | 206 | 198 |

FIG. 11

| 223 | 212 | 200 | 198 | 206 | 216 | 222 | 222 |
|-----|-----|-----|-----|-----|-----|-----|-----|
| 218 | 222 | 225 | 223 | 217 | 212 | 211 | 211 |
| 201 | 220 | 238 | 236 | 219 | 204 | 203 | 210 |
| 210 | 219 | 216 | 188 | 147 | 118 | 114 | 122 |
| 241 | 213 | 161 | 100 | 46 | 14 | 5 | 7 |
| 233 | 173 | 95 | 46 | 37 | 49 | 57 | 58 |
| 209 | 129 | 46 | 35 | 94 | 160 | 187 | 184 |
| 212 | 117 | 26 | 30 | 119 | 205 | 229 | 215 |

FIG. 12

VERTICAL FILTER

| 221 | 217 | 213 | 211 | 212 | 214 | 217 | 217 |
|---|---|---|---|---|---|---|---|
| 214 | 218 | 221 | 219 | 214 | 211 | 212 | 214 |
| 210 | 220 | 226 | 216 | 194 | 178 | 176 | 181 |
| 217 | 217 | 205 | 175 | 1863 | 161 | 159 | 166 |
| 228\| | 202\| | 157\| | 111\|\| | 42 | 32 | 31 | 33 |
| 228\| | 172\|\| | 101\| | 60 | 59 | 32 | 31 | 33 |
| 218\|\| | 140\|\| | 56 | 37\| | 83\|\| | 183\| | 208 | 200 |
| 211\|\| | 123\|\| | 36 | 33\|\| | 107\|\| | 183\| | 208 | 200 |

FIG. 13

VERTICAL EDGE MAP

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 1 | 1 | 1 | 1 | 0 | 0 | 0 |
| 1 | 1 | 1 | 0 | 0 | 0 | 0 |
| 1 | 1 | 0 | 1 | 1 | 1 | 0 |
| 1 | 1 | 0 | 1 | 1 | 1 | 0 |

FIG. 14

HORIZONTAL FILTER

| 218 | 212 | 203 | 201 | 207 | 215 | 220 | 222 |
|---|---|---|---|---|---|---|---|
| 220 | 222 | 223 | 222 | 217 | 213 | 211 | 211 |
| 211 | 220 | 231 | 231 | 220 | 209 | 206 | 207 |
| 215 | 215 | 208 | 184 | 151 | 126 | 118 | 118 |
| 241 | 213 | 161 | 100 | 30 | 22 | 9 | 6 |
| 233 | 173 | 95 | 42 | 44 | 48 | 55 | 58 |
| 209 | 129 | 41 | 41 | 94 | 160 | 186 | 186 |
| 212 | 117 | 28 | 28 | 119 | 205 | 222 | 222 |

FIG. 15

HORIZONTAL EDGE MAP

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 1 | 1 | 1 | 1 | 1 | 1 |
| 0 | 0 | 1 | 1 | 1 | 1 | 1 | 1 |
| 0 | 1 | 1 | 1 | 0 | 1 | 1 | 1 |
| 0 | 1 | 1 | 0 | 1 | 1 | 1 | 1 |
| 0 | 0 | 0 | 0 | 1 | 1 | 1 | 1 |

FIG. 16

VERTICAL FILTERING

| 219 | 215 | 210 | 208 | 210 | 214 | 218 | 218 |
|---|---|---|---|---|---|---|---|
| 216 | 219 | 221 | 219 | 215 | 212 | 212 | 213 |
| 212 | 220 | 23  | 229 | 219 | 210 | 207 | 209 |
| 219 | 216 | 210 | 185 | 150 | 124 | 117 | 119 |
| 232 | 214 | 161 | 100 | 37  | 20  | 8   | 6   |
| 229 | 173 | 95  | 42  | 40  | 48  | 55  | 58  |
| 216 | 125 | 37  | 38  | 94  | 160 | 186 | 185 |
| 211 | 121 | 32  | 32  | 119 | 205 | 224 | 220 |

FIG. 17

AFTER THREE FILTERS

| 217 | 217 | 216 | 215 | 214 | 214 | 214 | 215 |
|---|---|---|---|---|---|---|---|
| 218 | 219 | 219 | 218 | 216 | 213 | 213 | 213 |
| 218 | 219 | 222 | 221 | 217 | 213 | 211 | 211 |
| 221 | 216 | 202 | 181 | 154 | 132 | 121 | 118 |
| 226 | 214 | 161 | 100 | 34  | 22  | 13  | 8   |
| 225 | 173 | 95  | 39  | 38  | 47  | 53  | 56  |
| 219 | 123 | 35  | 37  | 94  | 160 | 186 | 185 |
| 215 | 123 | 35  | 35  | 119 | 205 | 222 | 222 |

FIG. 18

| | | | | | | | |
|---|---|---|---|---|---|---|---|
| 257(±16) | 128(±11) | 163(±10) | 76(±16) | -1(±24) | -1(±40) | 1(±51) | -4(±61) |
| 314(±12) | 24(±12) | -172(±14) | -107(±19) | -3(±26) | 2(±58) | -3(±60) | 3(±55) |
| 148(±14) | -243(±13) | 52(±16) | 75(±24) | 10(±40) | -2(±57) | 3(±69) | 2(±56) |
| -174(±14) | 139(±17) | 24(±22) | -21(±29) | -6(±51) | 0(±87) | -3(±80) | -1(±62) |
| -26(±18) | 49(±22) | -15(±37) | -13(±56) | -7(±68) | 0(±114) | 1(±103) | -4(±77) |
| 52(±24) | -64(±35) | -1(±55) | 16(±64) | 12(±81) | 3(±104) | -1(±113) | 2(±92) |
| 2(±49) | 7(±64) | -1(±78) | -3(±87) | -3(±103) | -6(±121) | 2(±120) | 4(±101) |
| 1(±72) | -2(±92) | 5(±95) | -3(±98) | -3(±112) | 6(±100) | -1(±103) | -6(±99) |

FIG. 19

| | | | | | | | |
|---|---|---|---|---|---|---|---|
| 257 | 128 | 163 | 76 | -1 | -1 | 1 | -4 |
| 314 | 24 | -172 | -107 | -3 | 2 | -3 | 3 |
| 148 | [-247] | 52 | 75 | 10 | -2 | 3 | 2 |
| -174 | 139 | 24 | -21 | -6 | 0 | -3 | -1 |
| -26 | 49 | -15 | -13 | -7 | 0 | 1 | -4 |
| 52 | -64 | -1 | 16 | 12 | 3 | -1 | 2 |
| 2 | 7 | -1 | -3 | -3 | -6 | 2 | 4 |
| 1 | -2 | 5 | -3 | -3 | 6 | -1 | -6 |

FIG. 20

| | | | | | | | |
|---|---|---|---|---|---|---|---|
| 216 | 216 | 215 | 215 | 214 | 214 | 215 | 216 |
| 217 | 219 | 219 | 218 | 216 | 213 | 214 | 213 |
| 218 | 219 | 222 | 221 | 217 | 213 | 211 | 211 |
| 221 | 216 | 203 | 181 | 154 | 131 | 120 | 117 |
| 227 | 215 | 161 | 100 | 34 | 21 | 13 | 7 |
| 226 | 173 | 95 | 40 | 38 | 47 | 53 | 55 |
| 218 | 123 | 35 | 37 | 94 | 160 | 186 | 186 |
| 214 | 122 | 35 | 35 | 120 | 205 | 223 | 223 |

DECOMPRESSION OF STANDARD ADCT-COMPRESSED DOCUMENT IMAGES

The present invention is directed to a method of decompressing images compressed in accordance with the currently proposed JPEG ADCT (adaptive discrete cosine transform) standard, and more particularly, a method of reducing decompression artifacts in document-type images resulting from decompression of standard JPEG ADCT compressed images.

BACKGROUND OF THE INVENTION

Data compression is required in data handling processes, where too much data is present for practical applications using the data. Commonly, compression is used in communication links, where the time to transmit is long, or where bandwidth is limited. Another use for compression is in data storage, where the amount of media space on which the data is stored can be substantially reduced with compression. Yet another application is a digital copier where an intermediate storage for collation, reprint or any other digital copier functions. Generally speaking, scanned images, i.e., electronic representations of hard copy documents, are commonly large, and thus are desirable candidates for compression.

Many different compression techniques exist, and many are proprietary to individual users. However, standards are desirable whenever intercommunication between devices will be practiced. Particularly with the advent of multimedia communication, where formerly dissimilar devices are required to communicate, a common standard will be required. An example is the current desirability of FAX machines to be able to communicate with printers. Currently, compression standards are generally distinct for different devices.

Three major schemes for image compression are currently being studied by international standardization groups. A first, for facsimile type image transmission, which is primarily binary, is under study by the JBIG (Joint Binary Image Group) committee, a second for TV and film, a standard is worked on by the MPEG (Motion Pictures Expert Group). For non-moving general images, i.e., still images which are more general than the ones covered by JBIG, the group JPEG (Joint Photographic Expert Group) is seeking to develop a device independent compression standard, using an adaptive discrete cosine transform scheme.

ADCT (Adaptive Discrete Cosine Transform, described for example, by W. H. Chen and C. H. Smith, in "Adaptive Coding of Monochrome and Color Images", IEEE Trans. Comm., Vol. COM-25, pp. 1285-1292, November 1977), as the method disseminated by the JPEG committee will be called in this application, is a lossy system which reduces data redundancies based on pixel to pixel correlations. Generally, in images, on a pixel to pixel basis, an image does not change very much. An image therefore has what is known as "natural spatial correlation". In natural scenes, correlation is generalized, but not exact. Noise makes each pixel somewhat different from its neighbors.

Generally, as shown in FIG. 1, the process of compression requires a tile memory 10 storing an $M \times M$ tile of the image. We will use square tiles in the description based on the JPEG recommendations, but it has to be noted that the inventive method can be performed with any form of tiling. From the portion of the image stored in tile memory, the discrete cosine transform (DCT), a frequency space representation of the image is formed at transformer 12. Hardware implementations are available, such as the C-Cube Microsystems CLS50A JPEG image compression processor, which operates in either the compression or the decompression mode according to the proposed JPEG standard. A divisor/quantization device 14 is used, from a set of values referred to as a Q-Table, stored in a Q table memory 16, so that a distinct Q table value is divided into the DCT value, returning the integer portion of the value as the quantized DCT value. A Huffman encoder 20 using statistical encoding the quantized DCT values to generate the compressed image that is output for storage, transmission, etc.

The current ADCT compression method divides an image into $M \times M$ pixel blocks, where $M = 8$. The selection of $M = 8$ is a compromise, where the larger the block given, the higher the compression ratio obtainable. However, such a larger block is also more likely to have non-correlated pixels within the block, thereby reducing the compression ratio. If the block was smaller, greater correlation within the block might be achieved, but less overall compression would be achieved. Particularly within a document image, edges of the image are more likely to be encountered within an $8 \times 8$ block, than would be the case for a scene forming a natural image. Thus, the assumption of spatial correlation fails to some extent. A major problem addressed by the present invention, and as will become more apparent hereinbelow, is that the assumptions of the ADCT proposal work well for photographs containing continuous tones and many levels of gray pixels, but often work poorly for the reproduction of document images, which have significant high frequency components and many high contrast edges.

Compression schemes tend to use a set of basis functions to utilize the intra block correlations. Basis functions define the data as a projection onto a set of orthogonal functions on an interval. ADCT uses cosine functions as the basis functions and the Discrete Cosine Transform (DCT) as the projection step. In the first step of the ADCT standard, the image is tiled into $8 \times 8$ blocks. Within each block, a set of 64 DCT coefficients is determined for the pixels in the block. The DCT coefficients represent the coefficients of each cosine term of the discrete cosine transform of the $8 \times 8$ block.

Referring now to FIG. 2A, an array of 64 gray level values representing 64 pixels in an $8 \times 8$ block of the image is shown. This $8 \times 8$ block is transformed according to the JPEG ADCT specifications giving the DCT coefficients shown in FIG. 2B. These coefficients still completely describe the image data of FIG. 2A, but in general larger values will now cluster at the top left corner in the low spatial frequency region. Simultaneously, in the vast majority of images as the frequency of the image increases, the coefficient values in the lower right hand portion of the grid tend towards zero.

Generally, the human eye tends to see low frequencies in an image best. At higher frequencies, changes from amplitude to amplitude are unnoticeable, unless such changes occur at extremely high contrast. This is a well known effect of the Human Visual System and extensively documented, see e.g. "Visual Performance and Image Coding" by P. Roetling, *Proceedings of the S.I.D.* 17/2 pp. 111-114 (1976). The ADCT method makes use of the fact that small amplitude changes at high frequencies can be generally ignored.

The next step in the ADCT method involves the use of a quantization or Q-matrix. The Q-matrix shown in FIG. 2C is a standard JPEG-suggested matrix for compression, but ADCT as well as the proposed inventive method can also operate using other Q-matrices (or Q-Tables). The Q-table values may be multiplied uniformly by a factor selected to increase or decrease compression. The matrix incorporates the effect that lower frequencies are roughly more important than high frequencies by introducing generally larger quantization steps, i.e. larger entries, for larger frequencies. However, the table also attempts to internally construct some desirable variations from the general assumption. Accordingly, the values in the table do vary with frequency, where the exact variation might be a function of the human visual system, of the document type expected, i.e.: photo; text, graphic, etc., or of some other application dependent parameter. Each of the DCT values from FIG. 2B is divided by a corresponding Q-matrix value from FIG. 2C giving quantized DCT (QDCT) values by way of:

$$QDCT[m][n] = INT\{DCT[m][n] \div Q\text{-}Table[m][n] + \tfrac{1}{2}\}$$

where INT{A} denotes the integer part of A

The remainder from the division process is discarded, resulting in a loss of data. Here and in the following we use the term division to describe the process detailed in ADCT including the methods for handling round-off. Furthermore, since the Q values in the lower right hand portion of the table tend to be high, most of the values in that area go to zero, unless there were extremely high amplitudes of the image at the higher frequencies.

After deriving the quantized set of DCT values, shown in FIG. 2D, pixels are arranged in the order of a space filling zigzag curve and a statistical encoding method, such as the Huffman process, is used to generate the transmitted signal. This statistical coding is performed in a lossless way and the only loss introduced in the compression is the one generated by the quantization of the DCT coefficients using the Q-Table.

ADCT transforms are well known, and hardware exists to perform the transform on image data, e.g., U.S. Pat. No. 5,049,991 to Nihara, U.S. Pat. No. 5,001,559 to Gonzales et al., and U.S. Pat. No. 4,999,705 to Puri. The primary thrust of these particular patents, however, is natural picture images, and not document images.

To decompress the now-compressed image, and with reference to FIG. 1, a series of functions or steps are followed to reverse of the process described. The Huffman encoding is removed at decoder 50. The image signal now represents the quantized DCT coefficients, which are multiplied at signal multiplier 52 by the Q table values in memory 54 in a process inverse to the compression process. At inverse transformer 56, the inverse transform of the discrete cosine transform is derived, and the output image in the spatial domain is stored at image buffer 58.

In the described decompression method, Huffman encoding is removed to obtain the quantized DCT coefficient set. Each member of the set is multiplied by a Q-Table value resulting in the DCT coefficients shown in FIG. 3A by using the data of FIG. 2C and 2D by ways of:

$$DCT[m][n] = QDCT[m][n] \times Q\text{-}Table[m][n].$$

However, the result shown in FIG. 3A is not the original set of DCT coefficients shown in FIG. 2B, because the remainders calculated for the original quantization of the DCT coefficients with the Q-Table in the compression process have been lost. In a standard ADCT decompression process, the inverse discrete cosine transform of the set of DCT coefficients is derived to obtain image values shown in FIG. 3B. Comparison of FIG. 3B with FIG. 2A show the difference.

The described process does not work to reproduce the best images. Clearly, it cannot reproduce the original image, since data within the image was discarded in the compression-quantization step. Failures are noted wherever strong edges, commonly present in text, appear. Particularly, at such edges "ringing artifacts" or in some references, "mosquito noise" is noted. These problems occur in text, graphics and halftones, components very common in document images. In addition to mosquito noise or ringing artifacts, a blocking artifact often appears associated with image areas with slowing varying grays, where each $M \times M$ block which formed the calculation of the compression basis appears visible. In either case, a problem has occurred.

In order to remove the artifacts noted, two methods of attacking the problem have been attempted. In a first method, the decompressed image is post processed, i.e., after the image has been fully decompressed, an attempt is made to improve the image. Of course, such processing can never go back to the original image, because that image has been lost. Such processes are demonstrated in the article "Reduction of Blocking Effects in Image Coding" by Reeve, III et al., Optical Engineering, January/February, 1984, Vol. 23, No. 1, p. 34, and "Linear Filtering for Reducing Blocking Effects in Orthogonal Transform Image Coding", by C. Avril et al., Journal of Electronic Imaging, April 1992, Vol. 1(2), pp. 183-191. However, this post-processing of the image leads to a reconstruction that could not have been the real source image and subsequent compression/decompression steps as they are possible in electronic imaging applications will lead to potentially larger and larger deviations between reconstruction and original.

Another approach to the problem is through an iterative decoding process using the known bandlimit of the data. In this method, using the compressed form of the image again, different blocks, perhaps 32 × 32, are used to decode the image. In one example, "Iterative Procedures for Reduction of Blocking Effects in Transform Image Coding", by R. Rosenholtz et al., SPIE, Vol. 1452, Image Processing Algorithms and Techniques II, (1991), pp. 116-126, a method of blurring the overall image was considered, with the hope that such blurring would tend to smooth out the block artifacts noted above.

U.S. patent application Ser. No. 07/956,128 to Eschbach (presented at the Annual Conference of the German Society for Applied Optics, 1993, Wetzlar FGR) provided a method of improving the appearance of a decompressed document image while maintaining fidelity with an original document image from which it is derived, wherein for compression, an original document image is divided into blocks of pixels, the blocks of pixels are changed into blocks of transform coefficients by a forward transform coding operation using a frequency space transform compression operation, the transform coefficients subsequently quantized with a lossy quantization process in which each transform coefficient is divided by a quantizing value from a quantization table and the integer portion of a result is used as a quantized transform coefficient, and the blocks of quantized transform coefficients are encoded with a lossless encoding method, the method including the decompression steps of: a) receiving the encoded quantized transform coefficient blocks for the original image; b) removing any lossless encoding of the quantized transform coefficient blocks for the original image; c) multiplying each quantized transform coefficient in a block by a corresponding quantizing value from the quantization table to obtain a block of received transform coefficients; d) recovering the image by applying an inverse transform operation to the received transform coefficients; e) with a selected filter, reducing high frequency noise appearing in the recovered image as a result of the lossy-quantization process, while preserving edges, whereby the appearance of the recovered image is rendered more visually appealing; f) changing the filtered recovered image into blocks of new transform coefficients by the forward transform coding operation using the frequency space transform operation; g) comparing each block of new transform coefficients to a corresponding block of received transform coefficients and the selected quantization table, to determine whether the filtered recovered image is derivable from the original image; and h) upon the determination transferring the filtered recovered image to an output. Step g) may include the additional steps of: 1) determining that the block of new transform coefficients is not derivable from the original image; and 2) altering individual new transform coefficients, so that a block of altered new transform coefficients is derivable from the original image, 3) recovering the image from the blocks of altered new transform coefficients. FIG. 4 provides a functional block diagram of the method described in that reference.

Experience with the above method taught that the process of DCT coefficient adjustment was computationally expensive, and still produced some ringing artifacts.

All of the references cited herein above are incorporated by reference for their teachings.

SUMMARY OF THE INVENTION

In accordance with the invention, there is provided a method of decompressing a compressed document image, wherein the decompressed image is filtered, and the filtered image is compared to the set of images derivable from the original image, before compression, to reduce image noise and assure that the decompressed image is within a known range of images.

In accordance with one aspect of the invention, there is provided a method of improving the appearance of a decompressed document image while maintaining fidelity with an original document image from which it is derived, wherein for compression, an original document image is divided into blocks of pixels, the blocks of pixels are changed into blocks of transform coefficients by a forward transform coding operation using a frequency space transform compression operation, the transform coefficients subsequently quantized with a lossy quantization process in which each transform coefficient is divided by a quantizing value from a quantization table and the integer portion of a result is used as a quantized transform coefficient, and the blocks of quantized transform coefficients are encoded with a lossless encoding method, the method including the decompression steps of: a) receiving the encoded quantized transform coefficient blocks for the original image; b) removing any lossless encoding of the quantized transform coefficient blocks for the original image; c) multiplying each quantized transform coefficient in a block by a corresponding quantizing value from the quantization table to obtain a block of received transform coefficients; d) recovering the image by applying an inverse transform operation to the received transform coefficients; e) i) adaptively selecting on a block by block basis a filter threshold, ii) detecting edges within the block and forming a mapping of the edges occurring, and iii) iteratively filtering for a predetermined number of times the image with a smoothing filter, the filtering operation controlled by the derived edge map and the determined threshold; f) comparing each block of new transform coefficients to a corresponding block of received transform coefficients and the selected quantization table, to determine whether the filtered recovered image is derivable from the original image; and h) upon the determination transferring the filtered recovered image to an output buffer.

By altering the decompression process, as opposed to altering the compression process, integrity and compatibility with the JPEG standard process are maintained independent on the number of compression/decompression cycles the document image data undergo. Additionally, the process can be selectively used, based on the image input, and whether improvements can be made using the inventive decompression process.

The process has advantage over that described in U.S. patent application Ser. No. 07/956,128 to Eschbach including 1) a more sophisticated algorithm can be used for edge-detection, which can result in a lower error rate and less number of iterations; 2) once the edges are detected, the information can be shared by different passes of filtering, the computational cost can thus be reduced; 3) for color images, sharing of edge information for different channels can reduce color leaking as well as computation.

These and other aspects of the invention will become apparent from the following descriptions to illustrate a preferred embodiment of the invention read in conjunction with the accompanying drawings in which:

FIG. 1 shows a functional block diagram for the prior art ADCT compression/decompression process;

FIG. 2A shows an 8×8 block of image data to be compressed; FIG. 2B shows the discrete cosine values as determined, giving a frequency space representation of the image of FIG. 2A; FIG. 2C shows the default C)-Table used in the examples; and FIG. 2D shows the quantized discrete cosine values as determined;

FIG. 3A shows the DCT values regenerated from the data of FIG. 2A by use of the Q-Table of FIG. 2C, and FIG. 3B shows the corresponding 8×8 reconstructed image data block FIG. 4 is a functional block diagram showing a system implementing the method of decompression described in U.S. patent application Ser. No. 07/956,128 to Eschbach, FIG. 5 shows the principle of a single set of quantized ADCT values representing a class of distinct and possible images;

FIGS. 6–8 are successive views of a continuing numerical example for the case of a multiple source image being represented by a single set of quantized ADCT value;

FIG. 10A shows a set of received DCT coefficients, and FIG. 10B which shows the standard Q table, with a Q factor set to 100, meaning that each entry is multiplied by 2;

FIG. 11 shows an 8×8 reconstructed image data block (distinct from that of FIG. 3B);

FIG. 12 shows the 8×8 reconstructed image data block after vertical filtering to find vertical edges;

FIG. 13 shows the edgemap for the data block of FIG. 12;

FIG. 14 shows the 8×8 reconstructed image data block after horizontal filtering to find horizontal edges;

FIG. 15 shows the edge map for the data block of FIG. 14;

FIG. 16 shows the first iteration result of horizontal filtering followed by vertical filtering, taking into account the edge maps of FIGS. 13 and 14;

FIG. 17 shows the first third iteration result of horizontal filtering followed by vertical filtering, taking into account the edge maps of FIGS. 13 and 14;

FIG. 18 shows the transform of the data of FIG. 17, and the accuracy bounds for each value;

FIG. 19 shows an adjusted set of coefficients;

FIG. 20 shows the output image values derived from the DCT coefficients of FIG. 19.

DETAILED DESCRIPTION OF THE INVENTION

Figure 1:
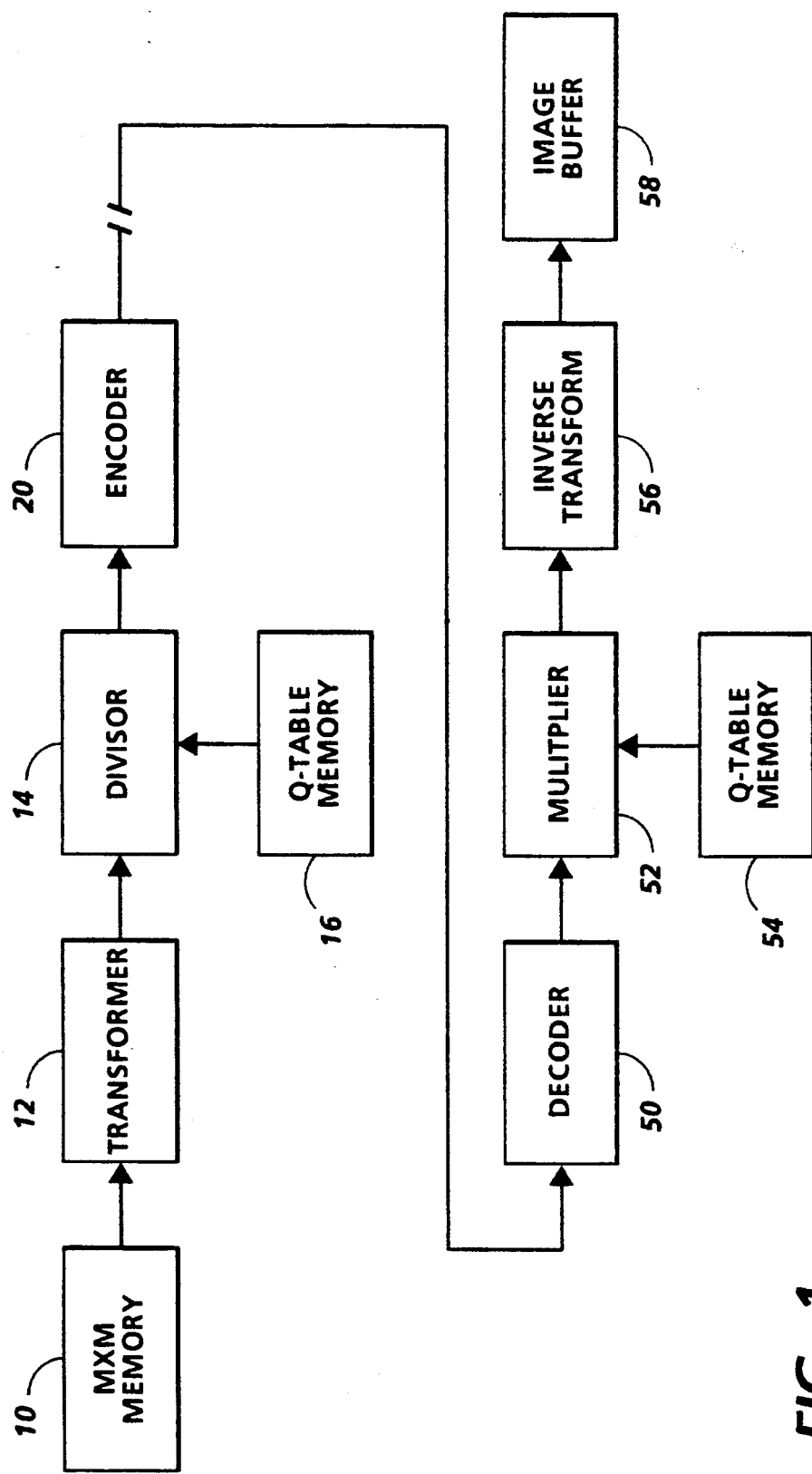
Figure 4:
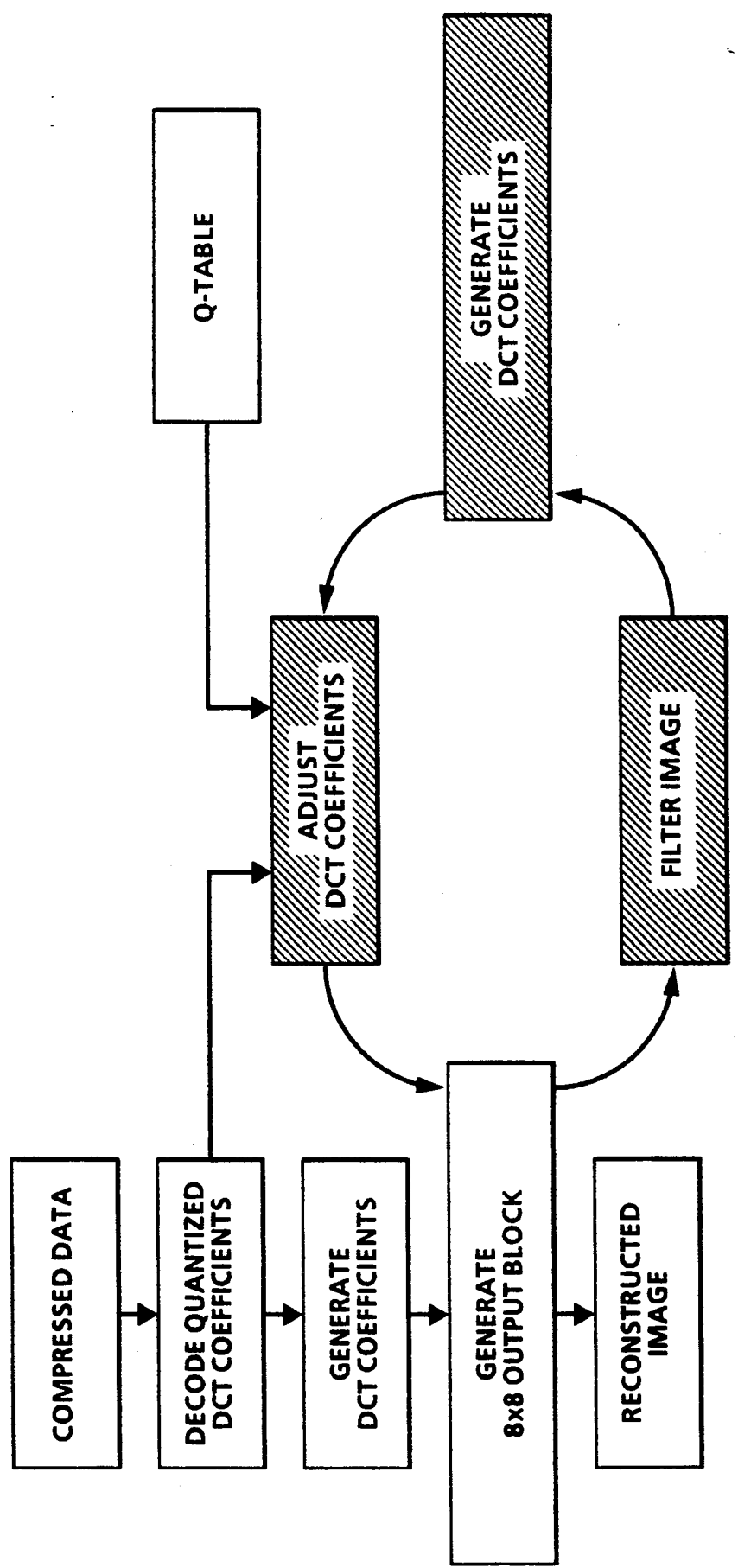
Figure 5:
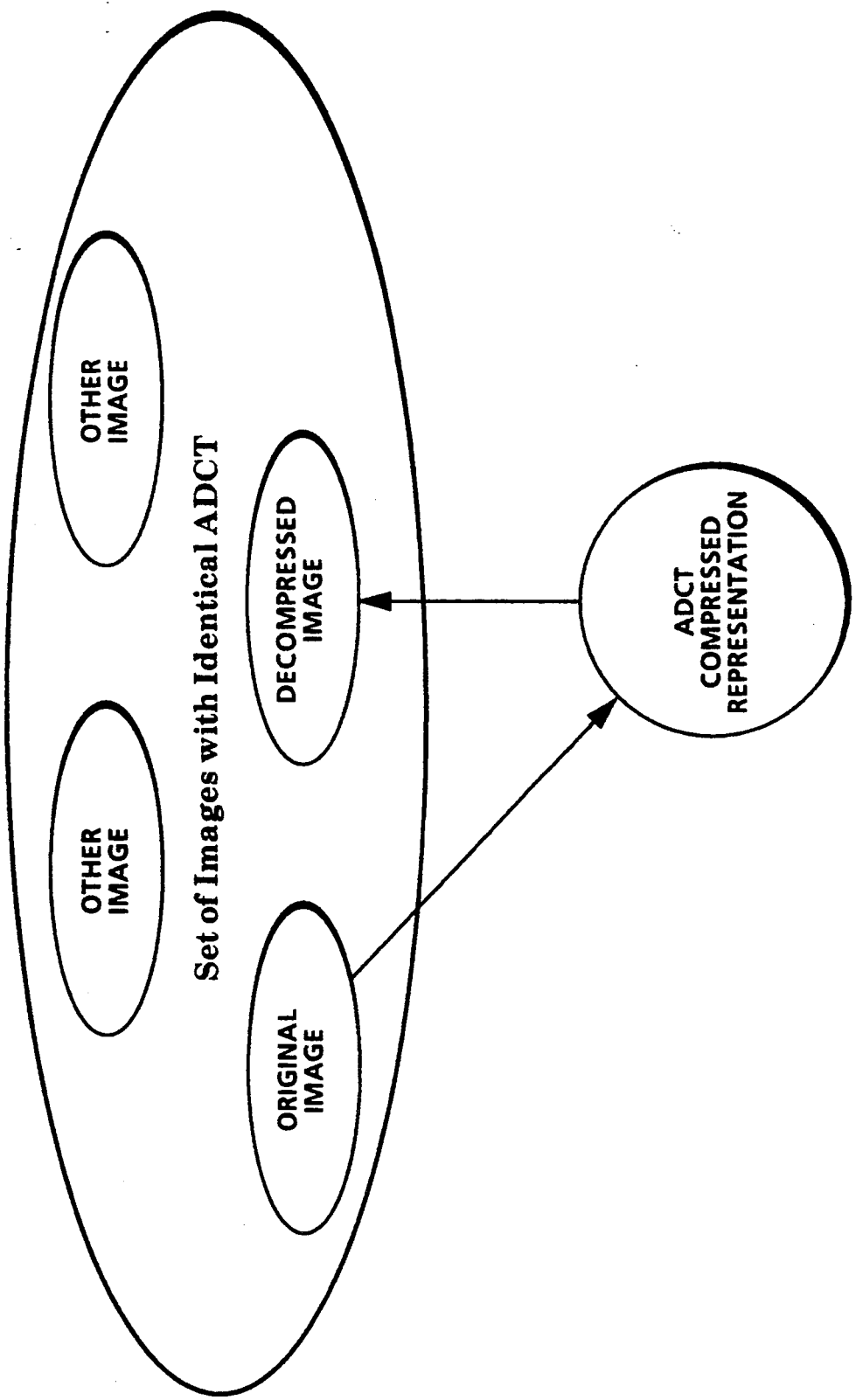

Referring now to the drawings where the showings are for the purpose of describing an embodiment of the invention and not for limiting same, we note initially, that while it is impossible to return to the exact image which was compressed originally in the compression process, because data has been lost in the compression process, it is possible to return to an image which is similar in some respect to the original compressed image, as will be further described with respect to the present invention, hereinafter. Secondly, it is possible to correct the basic image defects that are appearing in the image. With reference now to FIG. 5, a general overview of the compression/decompression process is shown. There exists a set of images which are distinct from each other, but which are similar in the respect that each image in the set compresses to the same ADCT representation. Therefore, any decompression process should produce an output image which is within this set. The knowledge of the set of possible images is coded by the Q-Table used. Since the Q-Table represents divisors of the discrete quantized transform coefficients, and as a result of the quantization process fractional portions of each coefficient are discarded, then the set of possible images represents all those images from which the same quantized transform coefficients can be determined about a range of possible coefficient values for each term of the transform. Finally, the present invention is directed to manipulations with document images, that may include gray. The term gray refers to pixel reflection intensities that are between a maximum and minimum value. Commonly, gray is defined on a pixel by pixel basis, as an 8 bit data value, varying between 0 and 255, where 0 and 255 represent black or white, and all other values represent intensities therebetween.

With reference now to FIG. 6, a set of possible source images 100, 102, 104 and 106, each consisting of image signals having a gray density value, ranging between 0 and 256 for the example, followed by their corresponding DCT coefficients as a result of the DCT conversion (for this illustration, illustrated as DCT block 108). These images represent portions of document images, generated by scanning an original document with an input scanner or created as an electronic document on a computer, etc. As can be seen, the images are distinct and the DCT coefficients 110, 112, 114 and 116 shown in FIG. 7 are distinct. The DCT coefficients are quantized at quantization 118 using the corresponding entries in the Q-Table 119 shown in FIG. 8. In this example the top left entry of the DCT coefficients is divided by the top left entry [16] in the Q-Table. Using a rounding operation for the fractional part, the result for those coefficients are in set 110, 157/16=9.81 rounds to 10, in set 112, 160/16=10 in set 114, 163/16=10.19 rounds to 10, and in set 116, 162/16=10.13 rounds to 10.

All of the top left entries in the table of DCT coefficients are therefore mappable to the same quantized DCT coefficients (set 120 shown in FIG. 8) using this Q-Table. The same is true for all other DCT coefficients shown in FIG. 6. The compressed data of set 120, therefore describes a set of possible source images rather than a unique source image with a subset of those possible source images shown in FIG. 6. The determination that an 8×8 image block is a possible source of the quantized DCT coefficients can be derived by considering the fact that the Q-Table entries define the quantizers and therefore the accuracy of the DCT coefficients. In the example given in FIG. 7, the top left entry is bounded by $153 \leq \text{entry} \leq 168$, spanning 16 values, any value in that range can be used as DCT coefficient without altering the compressed data. It is this "non-uniqueness" that is utilized in the inventive method, by selecting a possible source image that is i) a possible source image conforming with the compressed data and ii) an image that conforms to the model of a document image. In this way the inventive method differs from previous methods in which the ultimate image derived, does not conform to the compressed data as in post filtering methods, or does not use a source image model to restrict the decompression, but rather used a sampling consideration to blur the image.

In order to define an expectation for the input document image, it is noted that the image problem that results from the decompression process is ringing, or high frequency noise. Elimination of the high frequency noise is desirable, requiring a low pass filter. Unfortunately, the ringing occurs at edges, which are very common and important in document images. Accordingly, since edges represent high frequencies, which should not be removed, a simple linear low pass filter is not adequate, because it would destroy the edge information, i.e.: the readability of characters or the definition of lines, along with the reduction of noise. Rather, a low pass filter that preserves edges is required. Such a filter is a non-linear filter which might be an order statistical filter (or median filter), a sigma filter or the like. In U.S. patent application Ser. No. 07/956,128 to Eschbach, the median filter inherently detects and preserves edges as part of its filter operation.

Figure 9:
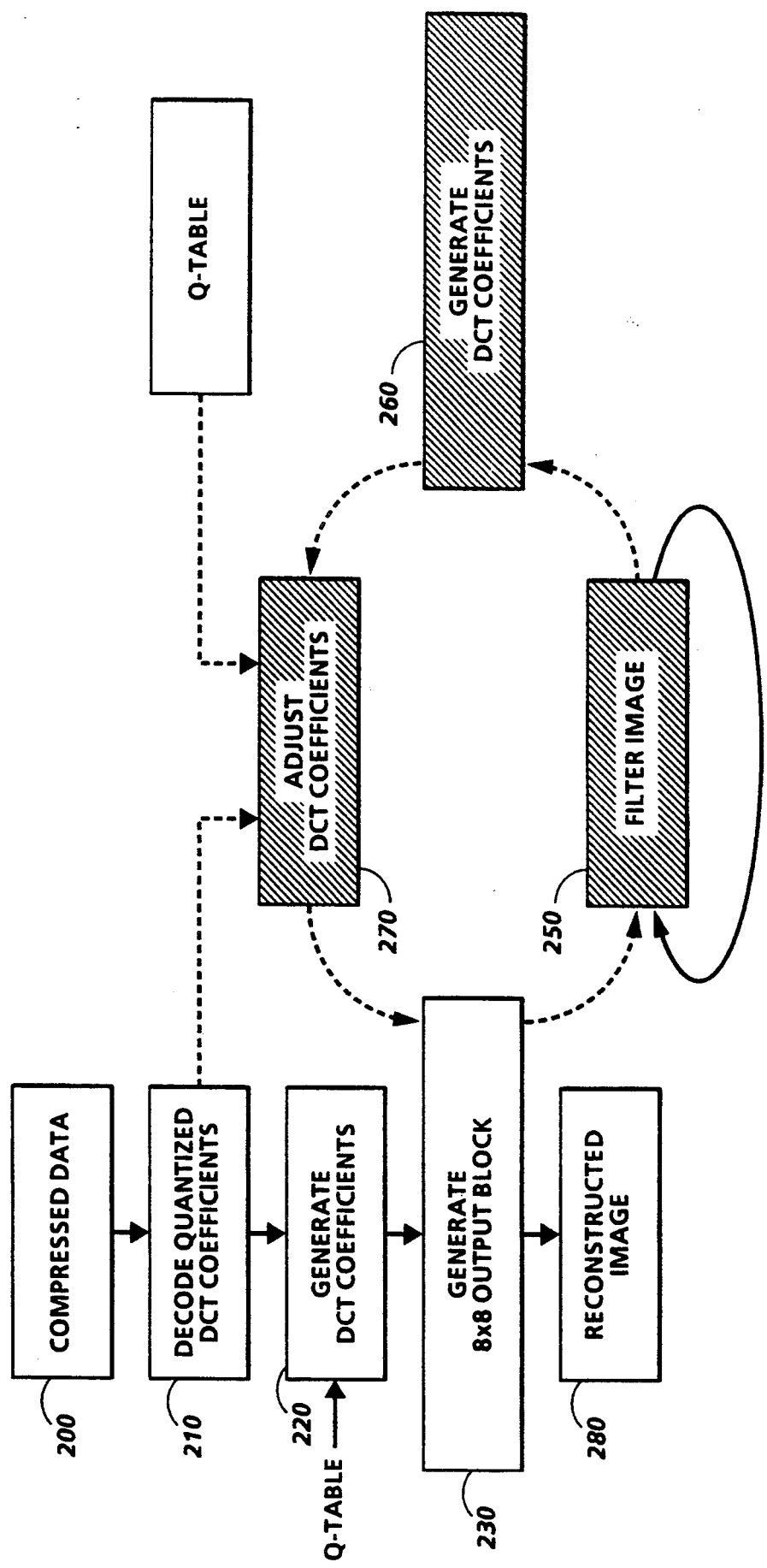
FIG. 9 is a functional block diagram showing a system implementing the inventive method of decompression.
Figure 21:
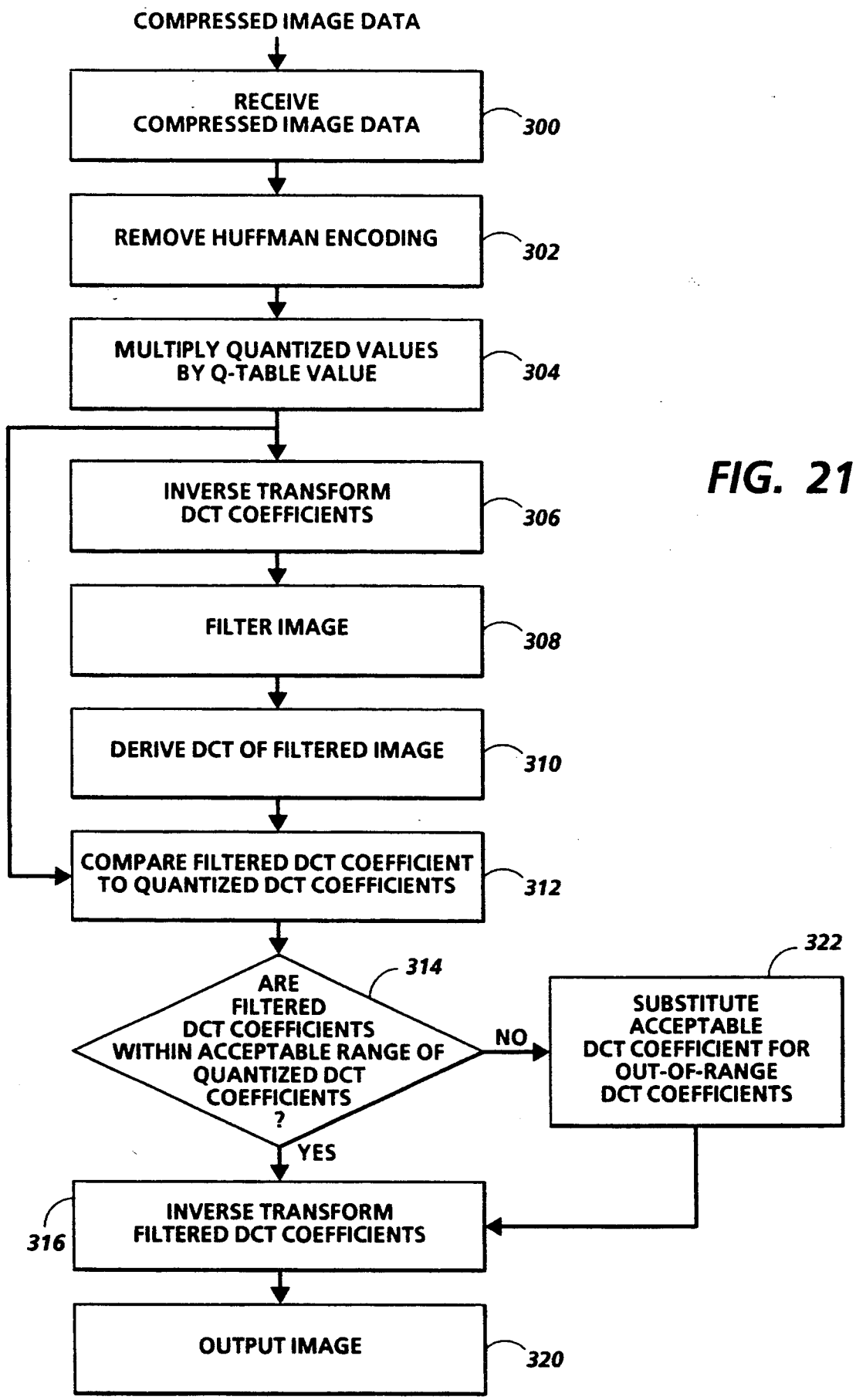
FIG. 21 shows a flow chart of the inventive method.

At FIG. 9, there is shown a system for improving the appearance of a decompressed document image while maintaining fidelity with an original document image from which it is derived, comprises a compressed data input 200, receiving data from a source of compressed data, such as from memory, or a transmission media. At block 210, the Huffman decoder stores the received compressed data and derives the quantized DCT signals therefrom, removing the statistical run length encoding from the data. At block 220, which essentially is a multiplier, the quantized coefficients, with the Q-table stored in ROM memory or the like, as an input, are converted to the unquantized DCT coefficients. At block 230, unquantized DCT coefficients are converted to spatial values representing the appearance of the image. In a standard JPEG ADCT decompression process, these values would be used for output. In accordance with the invention, instead of outputting the derived spatial values, the spatial image signal is iteratively filtered with a $\sigma$-filter 250, having an adaptively varied threshold selected for each image block, as will be hereinafter discussed. The resulting image is used as the input to a DCT transformer 260 which generates a set of frequency space coefficients much as the original compression process did, and finally a comparator 270 with the filtered transformed image, the received image and the Q-table as inputs, compares each block of filtered transform coefficients to a corresponding block of received transform coefficients and the selected Q table, to determine whether the filtered transformed image is derivable from the original image. If the filtered image is acceptable the filtered transformed image is transferred to block 230, which prepares the image for output at block 280. If the image is not acceptable, the DCT coefficients are changed as in U.S. patent application Ser. No. 07/956,128 to Eschbach. It has been discovered that while iterative DCT coefficient checking is possible, it is not required.

Now, looking at the process employed by the system in more detail, reference is made to FIG. 10A which provides an exemplary set of DCT coefficients, decoded and dequantized, and FIG. 10B, which shows the standard Q table, with a Q factor set to 100, meaning that each entry is multiplied by 2. From this Q table, two values, $\rho h$ and $\rho v$, are calculated for the horizontal (u) and vertical (v) components as $$P_h = B \left[ \sum_{v=0}^{7} d(u)\sin^2(u\pi)/16) \sum_{v=0}^{7} q^2(u,v) \right]^{1/2}$$

$$P_v = B \left[ \sum_{u=0}^{7} d(v)\sin^2(v\pi)/16) \sum_{u=0}^{7} q^2(u,v) \right]^{1/2}$$

where $d(u) = \frac{1}{2}$ for $u=0$ and $d(u)=1$ otherwise, $B=1/420$ is a preset constant, and $q(u,v)$ are the Q-table entries given. These calculations are done at the beginning of an image (as opposed to the beginning of a block of the image), and the result is used for the entire image. The two values $\rho h$ and $\rho v$ are used as part of the noise estimation for the edge detection process that will be described, and for the Q-Table used here, $\rho h$ and $\rho v$ are respectively equal to 2.094674 and 2.007254.

At FIG. 11, which illustrates the decompressed spatial image data, dynamic range (the maximum span of the input values over the current block) is calculated as $$R = max_{m,n \in w} input(m,n) - min_{m,n \in w} input(m,n)$$

where m and n are the spatial coordinates of the input pixels and w designates the set of coordinates that describe the current block. For the image block given above, the dynamic range is 236. From R and $\rho$ it is now possible to calculate the threshold value used in edge detection for the block as $$t(R,\rho) \begin{array}{ll} .6R & \text{for } R < 20\rho \\ .25R + 7\rho & \text{for } 20\rho \leq R \leq 50\rho \\ 0.15R + 12\rho & \text{for } R > 50\rho \end{array}$$

for this example $t_{vert}=59$, and $t_{horiz}=61$

Adequate threshold selection is essential for edge detection to distinguish the true edges from "noise edges" introduced by the quantization error. The threshold can be fixed for all images, or be adjusted image-wise, window-wise or even pixel-wise. In case an image-based threshold selection is preferred, t should be proportional to $\rho^{\frac{1}{2}}$, specifically, $$t = 32\rho^{\frac{1}{2}}$$

For the JPEG default Q table, t is about 32.

In considering the iterative application of the $\sigma$-filter, it is proposed that edge detection be separated from smoothing. Specifically, edges are first detected and the results are stored in bitmaps, or edge maps. Subsequent smoothing operations are then controlled by the edgemaps. The number of edgemaps is determined by the filter design. In one embodiment, 2-D filtering was implemented as a 1-D horizontal filtering followed by a 1-D vertical filtering. Two edge maps, one for horizontal direction and one for vertical direction are needed. One common practice is to compute the differences of local averages, or equivalently, smoothing the image vertically (horizontally) before the difference operation in horizontal (vertical) direction is applied. Another issue is the treatment of the pixels on the slopes of edges. It is desirable not to perform smoothing if the slope is relatively sharp. In the embodiment described the image window is first vertically filtered. In this process, a vertical edge between pixels (n, m) and (n−1, m) is declared if $|\Delta y'(n,m)| > t$, or
$|\Delta y'(n,m)| > \alpha t$ and (n,m) is on a slope
where $\neq y'(n,m) = y'(n,m) - y'(n-1,m), y'(.,.)$ is the smoothed version of the image,
t is the threshold, and
$\alpha$ is a constant chosen to be $\frac{1}{3}$ in the experiments.
A pixel (n,m) is considered to be on a slope if
$|y'(n,m) - y'(n-2,m)| > t$ and
$y'(n,m) - y'(n-2),m)$ has the same sign as $\Delta y'(n,m)$, or
$|y'(n+1,m) - y'(n-1,m)| > t$ and
$y'(n+1,m) - y'(n-1),m)$ has the same sign as $\Delta y'(n,m)$ Horizontal edges are detected in a similar manner.

Using the example data of FIG. 11, a vertical low pass filter operates on that data using a 1×3 $\sigma$-filter with threshold 0.4 R, which for this example provides threshold 94 to obtain the results of FIG. 12. Of course, other filter sizes may be used, as suggested by the particular requirements of the processing method. Using the edge determination equations with $t_{vert}=59$, edges are determined at the locations marked " || ", and edge slopes are marked with a "|". A vertical edge map is output with an ON signal where an edge or slope is detected, as shown in FIG. 12, while non edge or slope values are marked with an OFF signal. FIG. 13 shows the results of the same process using threshold 94, and a resulting horizontal 3×1 σ-filter. FIG. 14 shows the resulting horizontal edge map, using the edge determination equations with $t_{horiz}=61$.

With the edge maps determined, the input data block is now filtered with a horizontal filter (3×1) using the vertical edge map and a vertical filter (1×3) using the horizontal edge map. The filtering is performed as the average of the input pixels under the window, in the following manner at the horizontal filter:

$$output(m,n)=\tfrac{1}{3}\{input(m-1,n)+input(m,n)+input(m+1,n)\}$$

where, input(m±1,n) is replaced by input(m,n) for all input (m±1,n) separates from input(m,n) by a vertical edge/edge-slope is shown in the edge map. Thus, given the fifth row of input data 241 213 161 100 46 14 5 7 and the corresponding vertical edge map 1 1 1 1 0 0 0

The horizontal filtering with a 3×1 window results in the modified row of 241 213 161 100 35 20 8 6 wherein the first four pixels have not been changed since they are individually separated by vertical edges from all other pixels. The fifth pixel in the row was generated using $\tfrac{1}{3}\{46+46+14\}=34$ by replacing the fourth pixel by the center pixel due to the vertical edge between pixels 4 and 5.

The resulting image through an iteration of horizontal filtering followed by vertical filtering is shown in FIG. 16, while the result on the third iteration is shown in FIG. 17.

The spatial image data of FIG. 17, which has been iteratively filtered with the special purpose σ-filter described, is now transformed into frequency space using a forward DCT process, deriving the values of FIG. 18. Shown adjacent to each value is the range of accuracy possible given the quantization table. These iteratively DCT coefficients and accuracy bounds are compared to the originally received coefficients (See FIG. 3B), where coefficients marked outside the accuracy range are marked. These coefficients are then brought back into the accuracy range, as in U.S. patent application Ser. No. 07/956,128 to Eschbach.

There exist many possible variations of the above scheme. For example, the image content can be defined by other measures (with some adjustments) such as the maximum value or mean square value of the differences between the neighboring pixels. In fact, all these measures give similar performances.

The process of filtering the image, transforming to frequency space, comparing and altering the frequency space values, and retransforming back to gray image pixels may be reiterated a number of times. The number of iterations can be selected on a basis of no changes in the DCT transform (i.e., there is convergence). Alternatively, the process may be iterated until there are no further changes in the image (another type of convergence). In yet another alternative as described herein, the number of iterations set to a fixed number, or a fixed number can serve as an upper limit of iterations.

Now the image is a new one. First, it is noted that this image is a possible original image, which could have resulted in the compressed original image. Therefore, there is some fidelity to the original image. The image has been smoothed at least once to remove high frequency noise while enhancing or maintaining edges. The correction may have introduced changes in the image, but a compressed version of the filtered image has been compared to the original compressed image (the original possible set) to assure fidelity. The filtered image was corrected as required. It is assumed that the corrected filtered image is better than the filtered image because it is in complete agreement with the range of possible images.

With reference now to FIG. 9, a flow chart of the inventive iterative ADCT decompression/reconstruction showing the additional operations of the present invention is provided. An image compressed in accordance with the ADCT compression method with statistical encoding is obtained at step 300. The statistical encoding is removed at step 302 to obtain quantized DCT coefficients. At step 304, quantized DCT coefficients are multiplied by values in the Q table to obtain the set of DCT coefficients. At step 306, the inverse transform of the DCT coefficients is derived to produce the gray level image. Deviating from the normal process, at step 308 the 8×8 output block is filtered, as will be further described. At step 310, the filtered image output is used to generate a set of DCT coefficients. At step 312, the filtered image DCT coefficients are compared to the DCT coefficients obtained at step 312, and an acceptable range about each value. At step 314, if the filtered image DCT coefficients are within the acceptable range about each value, then at step 316, the inverse transform of the DCT coefficients is derived to produce the gray level image. At step 320, the gray image is directed to an output. If the filtered image DCT coefficients are not within the acceptable range about each value, then at step 322, acceptable values are substituted for out-of-range values. The data is transferred to block 316 for subsequent output at block 320.

Figure 22:
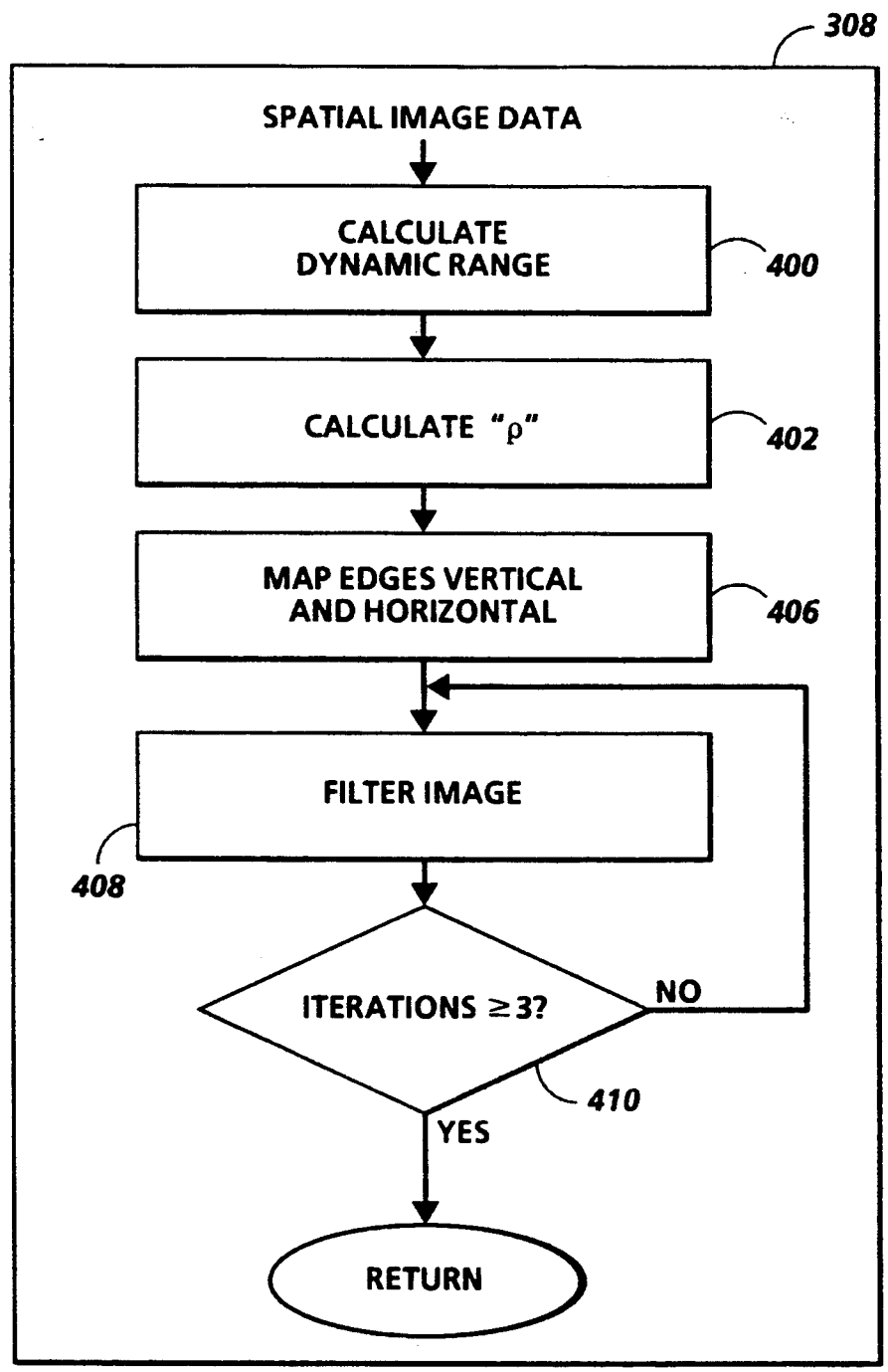
FIG. 22 shows a flow chart of the iterative filtering process.

In accordance with the invention, as shown in FIG. 22, the filtering step 308 may be subdivided into the steps of 400) calculating for each block the dynamic range S of the spatial image; 404) determining from S and ρ thresholds $t_{vert}$ and $t_{horiz}$ for the block; 406) mapping vertical and horizontal edges within the image, and 408) filtering the image, with a sigma filter, using the calculated threshold, and the edge map to control the filter function.

The invention has been described with reference to a particular embodiment. Modifications and alterations will occur to others upon reading and understanding this specification.

I claim:

1. A method of improving the appearance of a decompressed document image while maintaining fidelity with an original document image from which it is derived, wherein for compression, an original document image is divided into blocks of pixels, said blocks of pixels are changed into blocks of transform coefficients by a forward transform coding operation using a frequency space transform operation, said transform coefficients subsequently quantized with a lossy quantization process in which each transform coefficient is quantized according to a quantizing value from a quantization table and the result is used as a quantized transform coefficient, the method including the decompression steps of:

a) receiving said quantized transform coefficient blocks for said original image;
b) dequantizing the transform coefficients in a block according to a corresponding quantizing value from the quantization table to obtain a block of received transform coefficients;
c) recovering the image by applying an inverse transform operation to the received transform coefficients and producing blocks of pixels;
d) filtering the image with a non-linear filter, said filtering step including the substeps of:
   i. for each block of pixels, determining the dynamic range of the pixel block,
   ii. calculating, for each block of pixels, an edge threshold value, as a function of the dynamic range determined for the pixel block;
   iii. locating, using the edge threshold value, edges of the image within the block and producing therefrom an edge map;
   iv. filtering the image with a sigma filter, averaging pixel values in the block which are not identified as edges in the edge map;
e) changing the filtered recovered image into blocks of new transform coefficients by the forward transform coding operation using the frequency space transform compression operation;
f) comparing each block of new transform coefficients to a corresponding block of received transform coefficients and the selected quantization table, to determine whether the filtered recovered image is derivable from the original image; and
g) upon a positive determination transferring the filtered recovered image to an output buffer.

2. A method as described in claim 1, wherein step f) includes the additional steps of
   1) determining that the block of new transform coefficients is not derivable from the original image; and
   2) altering individual new transform coefficients, so that a block of altered new transform coefficients is derivable from the original image;
   3) recovering the image from the blocks of altered new transform coefficients.

3. A method as described in claim 1, wherein step d) includes the additional substep of:
   v. repeating the filtering step iv, for a predetermined number of iterations.

4. A method as described in claim 1, wherein the forward transform coding operation using the frequency space transform operation is a discrete cosine transform.

5. A method as described in claim 1, wherein for compression, the quantized transform coefficients are further encoded with a lossless encoding method, and the additional step of removing any lossless encoding is provided prior to step b).

6. A method of improving the appearance of an ADCT decompressed document image while maintaining fidelity with an original document image from which it is derived, wherein for compression, an original document image is divided into blocks of pixels, said blocks of pixels are changed into blocks of transform coefficients by a forward transform coding operation using a frequency space transform operation, said transform coefficients subsequently quantized with a lossy quantization process in which each transform coefficient is quantized according to a quantizing value from a quantization table and the result is used as a quantized transform coefficient, the method including the decompression steps of:
   a) receiving the encoded quantized transform coefficient blocks for the original image;
   b) removing any lossless encoding of the quantized transform coefficient blocks for the original image;
   c) multiplying each quantized transform coefficient in a block by a corresponding quantizing value from the quantization table to obtain a block of received transform coefficients;
   d) recovering the image by applying an inverse transform operation to the received transform coefficients to derive a block of pixels;
   e) filtering the recovered image, the filtering step including the substeps of
      i) adaptively selecting on a block by block basis, a filter threshold,
      ii) using the adaptively selected filter threshold, detecting edges within the block and forming a mapping of the edges therein occurring, and
      iii) iteratively filtering for a predetermined number of times the image with a smoothing filter, the filtering operation controlled by the derived edge map so as not to operate on image edges;
   f) comparing each block of new transform coefficients to a corresponding block of received transform coefficients and the selected quantization table, to determine whether the filtered recovered image is derivable from the original image; and
   g) upon the determination transferring the filtered recovered image to an output buffer.

7. A method as described in claim 6, wherein step f) includes the additional steps of
   1) determining that the block of new transform coefficients is not derivable from the original image; and
   2) altering individual new transform coefficients, so that a block of altered new transform coefficients is derivable from the original image;
   3) recovering the image from the blocks of altered new transform coefficients.

8. A method as described in claim 6, wherein step d) includes the additional substep of:
   v. repeating the filtering step iv, for a predetermined number of iterations.

9. A method as described in claim 6, wherein the forward transform coding operation using the frequency space transform operation is a discrete cosine transform.

10. A method as described in claim 6, wherein for compression, the quantized transform coefficients are further encoded with a lossless encoding method, and the additional step of removing any lossless encoding is provided prior to step b).

* * * * *